(12) United States Patent
Yan et al.

(10) Patent No.: US 11,152,613 B2
(45) Date of Patent: Oct. 19, 2021

(54) STABILIZED, PRELITHIATED SILICON OXIDE PARTICLES FOR LITHIUM ION BATTERY ANODES

(71) Applicant: Amprius, Inc., Sunnyvale, CA (US)

(72) Inventors: Kai Yan, Sunnyvale, CA (US); Hongduan Huang, Santa Clara, CA (US)

(73) Assignee: Amprius, Inc., Fremont, CA (US)

( * ) Notice: Subject to any disclaimer, the term of this patent is extended or adjusted under 35 U.S.C. 154(b) by 156 days.

(21) Appl. No.: 16/250,635

(22) Filed: Jan. 17, 2019

(65) Prior Publication Data

US 2019/0237761 A1    Aug. 1, 2019

Related U.S. Application Data

(60) Provisional application No. 62/619,711, filed on Jan. 19, 2018.

(51) Int. Cl.
*H01M 4/485* (2010.01)
*H01M 4/134* (2010.01)
(Continued)

(52) U.S. Cl.
CPC ......... *H01M 4/485* (2013.01); *H01M 4/0471* (2013.01); *H01M 4/131* (2013.01);
(Continued)

(58) Field of Classification Search
CPC .... H01M 4/485; H01M 4/134; H01M 4/1395; H01M 4/364; H01M 4/386; H01M 4/131;
(Continued)

(56) References Cited

U.S. PATENT DOCUMENTS

| 6,420,288 B2 | 7/2002 | Schweiger et al. |
| 7,452,836 B2 | 11/2008 | Apel et al. |

(Continued)

FOREIGN PATENT DOCUMENTS

| CN | 104617278 | 5/2015 |
| KR | 10-2014-0089643 | 7/2014 |

(Continued)

OTHER PUBLICATIONS

Office Action dated Mar. 13, 2013, in U.S. Appl. No. 13/363,947.
(Continued)

*Primary Examiner* — Stewart A Fraser
(74) *Attorney, Agent, or Firm* — Weaver Austin Villeneuve & Sampson LLP

(57) ABSTRACT

Although silicon-oxide based particles have stable capacity and high cycling efficiency as anode active material, they are known to suffer significant capacity loss during the first battery cycles. The addition of lithium silicate may help to mitigate the initial capacity loss, but it has been difficult to produce such anodes. During battery manufacture cell components are exposed to water, and lithium silicate is water soluble. As lithium silicate dissolves, the pH of the water increases, which can etch silicon, degrading the anode active material. Such degradation can be mitigated by doping lithium silicate with multivalent elements or by converting some silicon to metal silicide before water processing. Doping of lithium silicate makes it less soluble in water. And metal silicide is not as easily etched as silicon. While retaining the excellent capacity and stability of silicon-oxide based material, these methods and the structures they produce have been shown to increase the effective energy density of batteries that employ such structures by offsetting capacity loss in the first cycles.

20 Claims, 9 Drawing Sheets

(51) Int. Cl.

| | |
|---|---|
| *H01M 4/1395* | (2010.01) |
| *H01M 4/36* | (2006.01) |
| *H01M 4/131* | (2010.01) |
| *H01M 4/1391* | (2010.01) |
| *H01M 4/133* | (2010.01) |
| *H01M 10/0525* | (2010.01) |
| *H01M 4/38* | (2006.01) |
| *H01M 4/1393* | (2010.01) |
| *H01M 4/04* | (2006.01) |
| *H01M 4/587* | (2010.01) |
| *H01M 4/62* | (2006.01) |
| *H01M 4/58* | (2010.01) |
| *H01M 4/02* | (2006.01) |

(52) U.S. Cl.
CPC ......... *H01M 4/133* (2013.01); *H01M 4/134* (2013.01); *H01M 4/1391* (2013.01); *H01M 4/1393* (2013.01); *H01M 4/1395* (2013.01); *H01M 4/364* (2013.01); *H01M 4/386* (2013.01); *H01M 4/58* (2013.01); *H01M 4/587* (2013.01); *H01M 4/62* (2013.01); *H01M 10/0525* (2013.01); *H01M 2004/027* (2013.01); *H01M 2004/029* (2013.01)

(58) Field of Classification Search
CPC ............... H01M 4/1391; H01M 4/133; H01M 10/0525; H01M 4/1393
See application file for complete search history.

(56) References Cited

U.S. PATENT DOCUMENTS

| | | | |
|---|---|---|---|
| 8,067,108 | B1 | 11/2011 | Johnson |
| 9,748,573 | B2 | 8/2017 | Yang et al. |
| 2007/0122700 | A1 | 5/2007 | Miyachi et al. |
| 2007/0224508 | A1 | 9/2007 | Aramata et al. |
| 2009/0111020 | A1 | 4/2009 | Yamaguchi et al. |
| 2011/0215280 | A1* | 9/2011 | Obrovac ............... H01M 4/62 252/516 |
| 2012/0171560 | A1 | 7/2012 | Xu et al. |
| 2013/0230769 | A1 | 9/2013 | Xu et al. |
| 2014/0170485 | A1 | 6/2014 | Lee et al. |
| 2015/0221950 | A1 | 8/2015 | Minami et al. |
| 2016/0079591 | A1 | 3/2016 | Yang et al. |
| 2016/0260967 | A1* | 9/2016 | Matus ................. H01M 4/382 |
| 2017/0301915 | A1* | 10/2017 | Matus ................. H01M 4/386 |
| 2017/0346066 | A1 | 11/2017 | Sunano et al. |

FOREIGN PATENT DOCUMENTS

| | | |
|---|---|---|
| WO | WO2011/109328 | 9/2011 |
| WO | WO2012/063762 | 5/2012 |
| WO | WO2017/112502 | 6/2017 |

OTHER PUBLICATIONS

Yang, et al. "Fabrication of Si/SiO$_x$ Anode Materials by a Solution Reaction-Based Method for Lithium Ion Batteries," Research Paper, Korean J. Met. Mater., vol. 54, No. 10, 2016, pp. 708-786.

Non-Final Office Action dated Feb. 26, 2014, issued in U.S. Appl. No. 13/865,784.

International Search Report and Written Opinion dated May 8, 2019, issued in PCT Application No. PCT/US2019/014323.

International Preliminary Report on Patentability dated Jul. 30, 2020, issued in PCT Application No. PCT/US2019/014323.

European Extended Search Report dated Aug. 20, 2021, in Application No. 19740810.7.

Gao et al., "Engineered Si Sandwich Electrode: Si Nanoparticles/ Graphite Sheet Hybrid on Ni Foam for Next-Generation High Performance Lithium-Ion Batteries," Applied Materials & Interfaces, vol. 7, No. 3, Jan. 16, 2015, pp. 1693-1698.

NuLi, et al., "Cu$_5$Si-Si/C Composites for Lithium-Ion Battery Anodes," Journal of Power Sources, Elsevier, vol. 153, No. 2, Feb. 28, 2006, pp. 371-374.

* cited by examiner

STABILIZED, PRELITHIATED SILICON OXIDE PARTICLES FOR LITHIUM ION BATTERY ANODES

CROSS-REFERENCE TO RELATED APPLICATION

This application claims the benefit of priority to U.S. Provisional Patent Application No. 62/619,711, filed Jan. 19, 2018, which is incorporated by reference herein in its entirety.

BACKGROUND OF THE INVENTION

Field of the Invention

This invention relates generally to anode active materials for lithium-based battery cells, and, more specifically, to silicon oxide active materials that have very small capacity losses when used in lithium ion battery cells.

Silicon-oxide-based particles that contain both silicon and silicon oxide offer much promise as high-energy anode materials because of their high capacity and good cycling stability. But such materials have a major drawback; they have large capacity losses in the first cell cycles. During the first lithiation of such silicon-oxide-based particles in a battery cell, a significant amount of the silicon oxide reacts irreversibly to form lithium silicate, leading to low Coulombic efficiency in the first cell cycle and an overall reduced capacity for the cell.

It has been shown that some silicon oxide in a silicon-oxide-based particle can be converted to lithium silicate prior to use in a battery anode by annealing such particles with lithium species. However, such conversion often causes at least some crystallization of the silicon, significantly reducing its cycle life. More importantly, water, which is widely used in slurry processing and electrode casting during manufacturing of cell anodes, can leach lithium ions from lithium silicate. Thus, during processing, much of the lithium that was introduced into the silicon-oxide-based particles leaches into the water from the lithium silicate phase, especially near the surface of such particles, and is lost to the anode even before a battery can be assembled. Moreover, the leaching of lithium ions into the water raises the pH of the slurry, which in turn etches silicon and reduces the specific capacity of the anode. As the silicon is etched away, more lithium silicate is exposed and more leaching occurs, leading to yet more silicon etching. This phenomenon is more pronounced in silicon-oxide-based particles that have nanosized grains, which are especially useful as anode materials with long cycle life.

What is needed is a way to modify silicon-oxide-based particles while retaining their amorphous state in order to minimize initial capacity losses and maintain long cycle life when they are used in a battery cell anode. It would be especially useful if any such modification were compatible with standard battery cell processing and assembly techniques.

SUMMARY

In one embodiment of the invention, an active material for an anode in a lithium ion battery cell is disclosed. The active material includes particles that contain domains comprising silicon; domains comprising metal silicide; and domains comprising lithium silicate. In one arrangement, the metal silicide domains include silicon and a metal selected from the group consisting of chromium, cobalt, copper, iron, nickel, manganese, titanium, vanadium, and combinations thereof. In some embodiments, the particles include a dopant. The dopant may be any of magnesium, calcium, strontium, barium, boron, aluminum, gallium, indium, thallium, phosphorus, arsenic, antimony, bismuth, titanium, zirconium, hafnium and combinations thereof. In one arrangement, at least some of the lithium silicate domains include the one or more dopants. At least some of the lithium silicate domains at the surface of the particle may have a higher doping concentration than the lithium silicate domains that are deeper inside the particle. In one arrangement, there are metal silicide domains on at least a portion of the outer surface of the particle. In one arrangement, the outer surface contains no silicon domains.

In another embodiment of the invention, a method of producing an anode active material, includes the steps of providing particles comprising SiOx; adding metal salts and reducing agents to the particles; doing a first annealing at a temperature between 500° C. and 1000° C. for 0.1 to 20 hours in an inert atmosphere; adding an organic liquid that contains lithium species to the particles; and doing a second annealing of the second mixture at a temperature between 500° C. and 1200° C. for 0.1 to 48 hours in an inert atmosphere to form particles that contain silicon domains, lithium silicate domains, and metal silicide domains. The metal salts may contain any of chromium, cobalt, copper, iron, nickel, manganese, titanium, vanadium, and combinations thereof. The lithium species may contain any of lithium hydroxide, lithium nitrate, lithium acetate, lithium oxalate, lithium carbonate and lithium alkyoxides. In one arrangement, the lithium species is lithium metal particles. In one arrangement, the lithium species is a solution of lithium metal in tetrahydrofuran and polycyclic aromatic hydrocarbon.

In another embodiment of the invention, a method of producing an anode active material, includes the steps of providing first particles comprising Si and SiOx; mixing the particles together with one or more dopants and water; annealing to form doped first particles; providing one or more Li species; adding an organic liquid that contains lithium species to the first particles; and annealing at a temperature between 500° C. and 1200° C. for 0.1 to 48 hours in an inert atmosphere to form doped particles comprising silicon domains and lithium silicate domains. The dopants may contain any of magnesium, calcium, strontium, barium, boron, aluminum, gallium, indium, thallium, phosphorus, arsenic, antimony, bismuth, titanium, zirconium, hafnium and combinations thereof.

In one arrangement, the first annealing involves annealing in air or an inert gas at a temperature between 500° C. and 1000° C. for 0.1 to 20 hours. In one arrangement, the lithium species is any of lithium hydroxide, lithium nitrate, lithium acetate, lithium oxalate, lithium carbonate and lithium alkyoxides, and the first annealing involves annealing in air or an inert gas at a temperature between 500° C. and 1200° C. for 0.1 to 48 hours. In one arrangement, the lithium species includes lithium metal particles, and the first annealing comprises annealing in an inert gas at a temperature between 500° C. and 1200° C. for 0.1 to 48 hours. In one arrangement, the lithium species is a solution of lithium metal in tetrahydrofuran and polycyclic aromatic hydrocarbon, and the first annealing involves annealing in an inert gas at a temperature between 500° C. and 1200° C. for 0.1 to 48 hours.

In another embodiment of the invention, a negative electrode film is provided. The negative electrode film includes any of the active material described herein, graphite particles, and a binder. In some arrangements, the negative electrode film also includes electronically conductive particles. In one arrangement, there is a current collector in electronic communication with the negative electrode film.

In another embodiment of the invention, a battery cell is provided. The battery cell includes a negative electrode film as described above, a positive electrode that includes positive electrode active material particles, electronically-conductive particles, and an optional current collector, and a separator region between the positive electrode and the negative electrode. There is also an electrolyte included in the negative electrode film, the positive electrode and in the separator.

The electrolyte may be any of $LiPF_6$, $LiBF_4$, $LiAsF_6$, $LiN(CF_3SO_2)_2$, $LiN(C_2F_5SO_2)_2$, $LiCF_3SO_3$ etc. dissolved in propylene carbonate (PC), ethylene carbonate (EC), diethyl carbonate (DEC), dimethyl carbonate (DMC), ethyl methyl carbonate (EMC), ethyl propionate (EP), propyl propionate (PP), 1,2-dimethoxyethane (DME), 1,4-dioxane (DOL), tetrahydrofuran (THF), hydrofluoroether (HFE) and combinations thereof.

The positive electrode active material particles may be any of lithium cobalt oxide (LCO) lithium nickel oxide (LNO), lithium manganese oxide (LMO), lithium nickel-manganese-cobalt oxide (NMC), lithium nickel-cobalt-aluminum oxide (NCA), lithium iron phosphate (LFP), lithium cobalt phosphate (LCP), lithium vanadium phosphate(LVP).

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
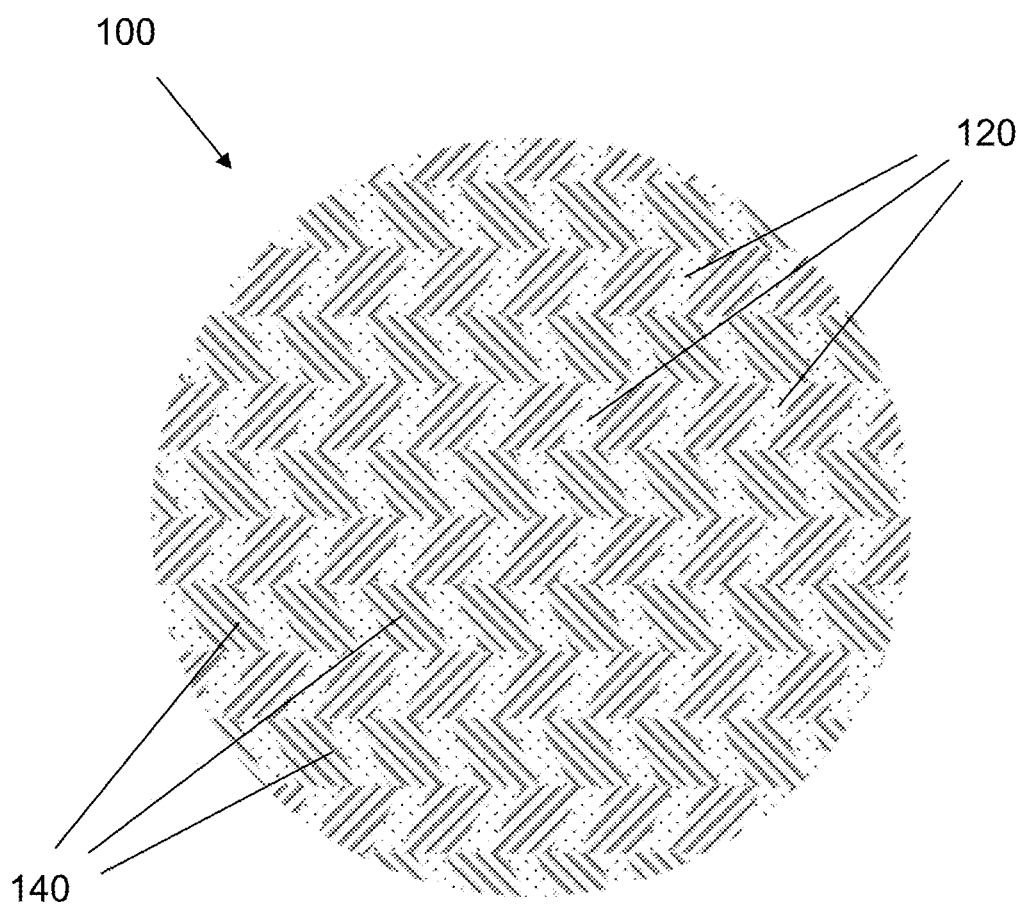
FIG. 1 is a schematic cross-section illustration of a silicon-oxide-based particle, according to an embodiment of the invention.

The embodiments of the invention are illustrated in the context of lithium ion battery cells. The aforementioned needs are satisfied by the materials and processes in the embodiments of the present invention as described herein.

All ranges disclosed herein are meant to include all ranges subsumed therein unless specifically stated otherwise. As used herein, "any range subsumed therein" means any range that is within the stated range.

As used herein, the term "lithium silicate" is can be described by the formula, $Li_2O.zSiO_2$, wherein z may be ¼, ⅓, ½, ⅔, 1, 2, and 3. It should be understood that lithium silicate often contains a variety of species with different x values.

The subscripts "x", "y", "a", and "b" are numbers greater than 0 that represent the molar ratios of the constituent parts of the compound.

TABLE I

Description of Terms used in Disclosure

| Term | Contains Domains of: | Formula |
|---|---|---|
| silicon-oxide-based particles | silicon<br>silicon oxide | Si<br>$SiO_x$ |
| silicided silicon-oxide-based particles | silicon<br>silicon oxide<br>metal silicide | Si<br>$SiO_x$<br>$M_aSi_b$ |
| composite silicate-silicon particles | silicon<br>lithium silicate | Si<br>$Li_2O \cdot zSiO_2$ |
| composite silicate-silicide particles | silicon<br>metal silicide<br>lithium silicate | Si<br>$M_aSi_b$<br>$Li_2O \cdot zSiO_2$ |

As described herein, silicon-oxide-based particles are particles that contain both silicon domains and silicon oxide domains. Such silicon-oxide-based particles can be prelithiated by processing with any of a number of lithium species to form composite silicate-silicon particles that contain both silicon domains and lithium silicate domains. Silicon-oxide-based particles may also be processed with other metals to form composite silicided silicon-oxide-based particles, in which there are silicon, silicon oxide, and metal silicide domains. Silicon-oxide-based particles can also be processed to form composite silicate-silicide particles that contain silicon, metal silicide, and lithium silicate domains. These particles are described in more detail below.

In one embodiment of the invention, silicon-oxide-based particles are doped with multivalent doping elements and then prelithiated by processing with any of a number of lithium species to form doped composite lithium silicate particles. Such processing has been shown to ensure stability of the lithium silicate phase in aqueous media (prevent leaching of lithium) while maintaining the high capacity and good cycling efficiency of the material and offsetting capacity loss in the first cycles when used as the active material in an anode in a lithium ion battery cell.

In one embodiment of the invention, silicon-oxide-based particles are heated with a metal to convert at least a portion of the silicon on the surface of the particles to metal silicide and then prelithiated by processing with any of a number of lithium species to form composite silicate-silicide particles. Metals that can be used to form silicides include, but are not limited to, chromium, cobalt, copper, iron, nickel, manganese, titanium, vanadium, and combinations thereof.

FIG. 1 is a schematic cross-section illustration of a silicon-oxide-based particle 100, according to an embodiment of the invention. The particle 100 has silicon oxide ($SiO_x$) domains 120 (dotted regions) and silicon domains 140 (striped regions). Although the particle 100 is shown as spherical in FIG. 1, it may have other shapes. Although the particle 100 is shown as having well-defined domains 120, 140, it should be understood that the domains may have any arbitrary shapes. In one arrangement, the silicon oxide (SiOx) domains 120 and silicon domains 140 are not at all well-defined, and the particle 100 can be described as a solid solution or fine mixture of silicon oxide and silicon. In one embodiment of the invention, the particle 100 is approximately equiaxed with an average diameter that ranges from 0.1 to 100 µm. In one arrangement, the silicon oxide domains 120 make up between 1 wt % and 99 wt % of the particle, and the silicon domains 140 make up the remaining 99 wt % to 1 wt % of the particle. Depending on the conditions that were used in making the silicon-oxide-based particles 100, the sizes of the silicon oxide domains 120 and the silicon domains 140 can range from less than 1 nm (amorphous) to as much as 100 nm (highly crystallized).

Figure 2:
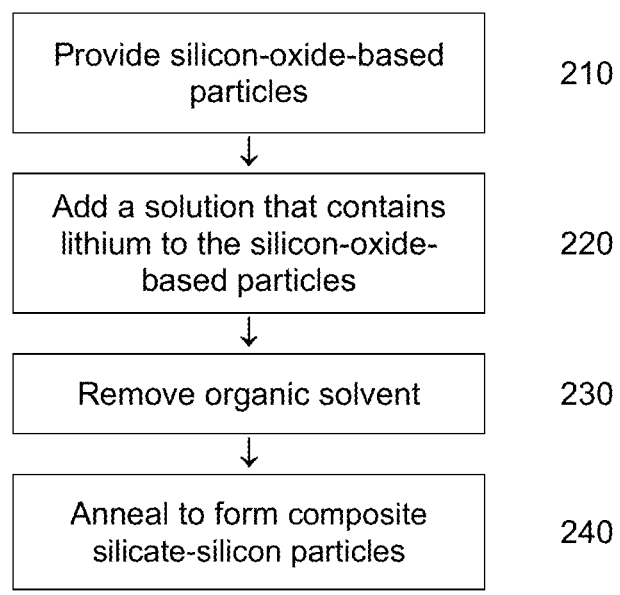
FIG. 2 is a flow chart that shows the steps in forming lithium silicate particles, according to an embodiment of the invention.

In one embodiment of the invention, a method for converting silicon-oxide-based particles to composite silicate-silicon particles is shown in the flow chart in FIG. 2. In step 210, silicon-oxide-based particles, such as described in FIG. 1, are provided. In step 220, a solution that contains lithium is added to the silicon-oxide-based particles in an inert atmosphere. The solution may act as a medium to conduct lithium from a lithium source to the silicon-oxide-based particles. The lithium species in the solution may be any of lithium hydrides, lithium hydroxide, lithium nitrate, lithium acetate, lithium oxalate, lithium carbonate, lithium alkyoxides, or lithium metal. The solution may contain a polycyclic aromatic hydrocarbon in ether, such as tetrahydrofuran (THF). Examples of useful polycyclic aromatic hydrocarbons include but are not limited to naphthalene, diphenyl, anthracene, phenanthrene, tetracene and pyrene. Other organic solvents that may be used in the solution include, but are not limited to, diethyl ether (DEE), 1,4-dioxane, dimethoxyethane, and methyl tert-butyl ether. In step 230, organic solvent is removed from the solution. In step 240, the silicon-oxide-based particles are annealed at temperatures between 400° C. and 1000° C. for 0.1 to 48 hours to form composite silicate-silicon particles. For lithium species such as lithium metal and lithium hydride, the annealing in step 240 is done in an inert gas such as argon.

Without wishing to be bound to any particular theory, once lithium is introduced into silicon-oxide-based particles, the arrangement of atoms inside the particles may no longer be homogeneous. The lithium combines with silicon oxide to form lithium silicate and any elemental Si left over from the reaction is available to form additional silicon domains in the composite silicate-silicon particles. The size of the domains in the composite silicate-silicon particles may be similar to domain sizes in silicon-oxide-based particles. Larger domains of both silicon and lithium silicate with higher crystallinity may be formed at higher processing temperatures, which may adversely affect battery cycle life.

Figure 3:
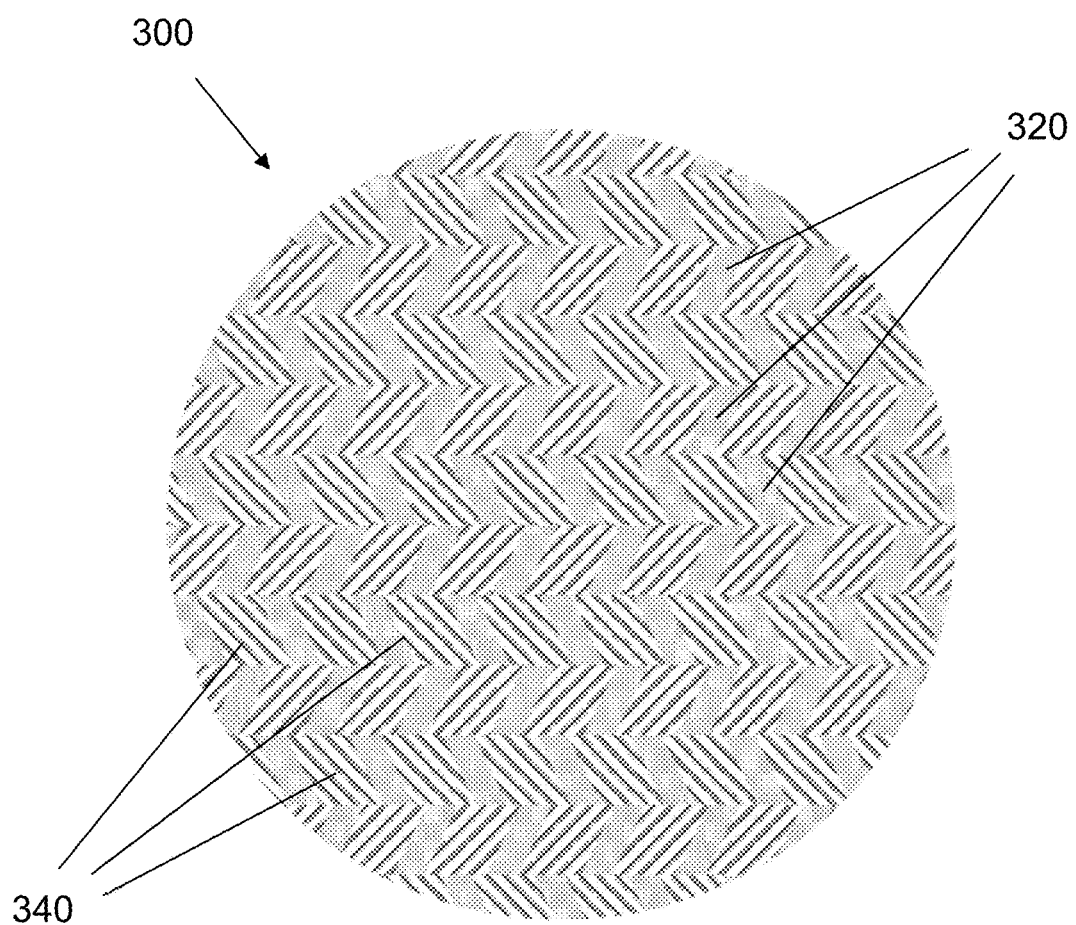
FIG. 3 is a schematic cross-section illustration of a composite lithium silicate particle that has silicon domains and lithium silicate domains, according to an embodiment of the invention.

FIG. 3 is a schematic cross-section illustration of a composite silicate-silicon particle 300, according to an embodiment of the invention. The particle 300 has lithium silicate domains 320 and silicon domains 340. Although the particle 300 is shown as spherical in FIG. 3, it may have other shapes. Although the particle 300 is shown as having well-defined domains 320, 340, it should be understood that the domains may have any arbitrary shapes. In one embodiment of the invention, the particle 300 is approximately equiaxed with an average diameter that ranges from 0.1 to 300 µm. In one arrangement, the lithium silicate domains 320 make up between 1 wt % and 99 wt % of the particle, and the silicon domains 340 make up the remaining 99 wt % to 1 wt % of the particle. Depending on the conditions that were used in making the composite silicate-silicon particle 300, the sizes of the lithium silicate domains 320 and the silicon domains 340 can range from less than 1 nm (amorphous) to as much as 100 nm (highly crystallized).

As described above, when lithium silicate is exposed to water, lithium ions are leached from the lithium silicate, and the lithium ions exchange with protons in the water, raising the pH of the water. Such leaching of lithium ions from the lithium silicate domains can occur when composite silicate-silicon particles, as described above, are mixed with water. The increased pH of the water promotes etching of the silicon domains, reducing the amount of silicon active material in the particles. Furthermore, as the silicon domains are etched, additional lithium silicate domains are exposed to water, and the pH of the water increases even more, accelerating etching of silicon domains. Such a chain reaction can continue until the entire particle is destroyed.

There may be two ways to mitigate this problem: 1) retard leaching of lithium ions from lithium silicate; and 2) retard etching of silicon.

Retard Lithium Silicate Leaching

In one embodiment of the invention, lithium silicate in composite silicate-silicon particles is doped to reduce the leachability of lithium silicate in water. Silicon-oxide-based particles are combined with dopants and annealed. Examples of useful dopants include, but are not limited to, salts of magnesium, calcium, strontium, barium, boron, aluminum, gallium, indium, thallium, phosphorus, arsenic, antimony, bismuth, titanium, zirconium, hafnium and combinations thereof. In one arrangement, the silicon-oxide-based particles and dopant(s) are annealed at temperatures between 500° C. and 1000° C. for 0.1 to 20 hours in air or in an inert gas such as argon. After the silicon-oxide-based particles are doped, they can be converted to composite silicate-silicon particles by combing them with a lithium solution and then annealed again. In one arrangement, such annealing is done at temperatures between 500° C. and 1000° C. for 0.1 to 20 hours in air or in an inert gas such as argon.

In another embodiment of the invention, conversion of silicon-oxide-based particles to composite lithium silicate particles and doping of the composite lithium silicate particles can be done with one annealing. The silicon-oxide-based particles are combined with both a lithium solution and dopant(s), the organic solvent in the lithium solution is removed, and the mixture is annealed. In one arrangement, annealing is done at temperatures between 500° C. and 1000° C. for 0.1 to 48 hours in an inert gas such as argon. For all lithium species except lithium metal and lithium hydride, the annealing may be done in air instead of in an inert atmosphere.

Prevent Etching of Silicon

In another embodiment of the invention, at least a portion of the surfaces of silicon-oxide-based particles is converted to metal silicide domains and then the particles are lithiated to form composite silicate-silicide particles (containing metal silicide domains, silicon domains, and lithium silicate domains) before exposure to water. In one arrangement, there are metal silicide domains mixed in with silicon domains and lithium silicate domains throughout the composite silicate-silicide particles. When such composite silicate-silicide particles are exposed to water, lithium ions may still be leached from the lithium silicate domains and raise the pH of the water. But, unlike silicon, many metal silicides are extremely resistant to etching. With metal silicide on at least a portion of the surface of composite silicate-silicide particles, such composite silicate-silicide particles are only mildly degraded, if at all, during processing in water, and can be used as anode active material in a battery cell.

Figure 4:
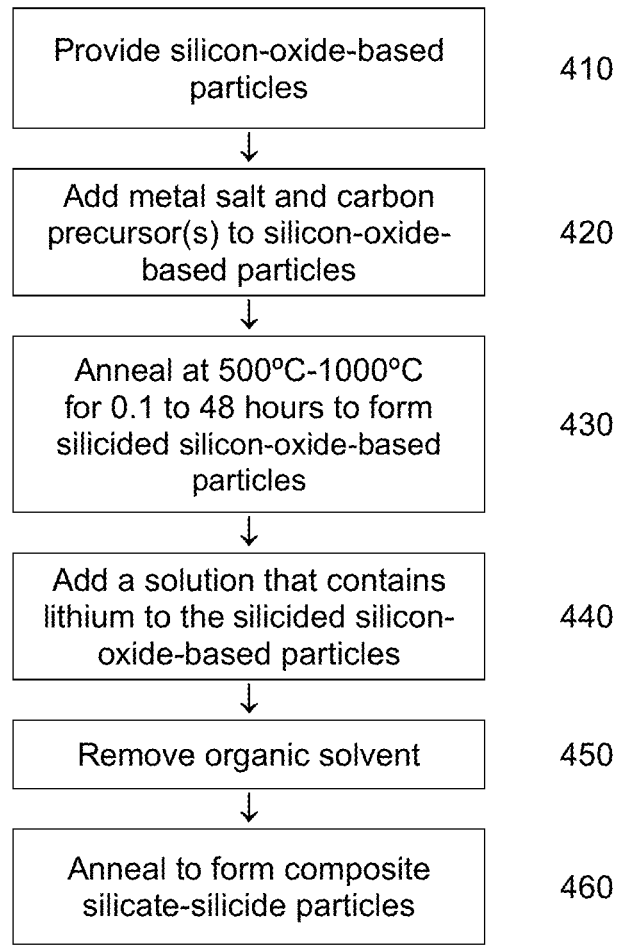
FIG. 4 is a flow chart that shows the steps in forming composite silicate-silicide particle, according to an embodiment of the invention.

In one embodiment of the invention, a method for converting silicon-oxide-based particles to composite silicate-silicide particles is shown in the flow chart in FIG. 4. In step 410, silicon-oxide-based particles, such as described in FIG. 1, are provided. In step 420, metal salt and carbon precursor(s) are mixed uniformly with silicon-oxide-based particles. Examples of metal salts that can be used include, but are not limited to, nitrate, acetate, lactate, citrate, ascorbate or carbonate salts of chromium, cobalt, copper, iron, nickel, manganese, titanium, vanadium, and combinations thereof. In step 430, the silicon-oxide-based particles, metal salt and carbon precursor (sugar) are annealed at temperatures between 500° C. and 1000° C. for 0.1 to 48 hours in an inert gas such as argon or nitrogen to form silicided silicon-oxide-based particles, i.e., particles that have metal silicide domains, silicon domains, and silicon oxide domains. In step 440, a solution that contains lithium, as described above, is added to the silicided silicon-oxide-based particles in an inert atmosphere. Details about the solution are included above in reference to FIG. 2. In step 450, organic solvent is removed. In step 460, the silicide silicon-oxide-based particles are annealed at temperatures between 400° C. and 1000° C. for 0.1 to 48 hours to form composite silicate-silicide particles. For lithium species such as lithium metal and lithium hydride, the annealing in step 460 is done in an inert gas such as argon.

The reactions in FIG. 4 may be expressed as follows:

$SiO + M \rightarrow MSi_x + Si + SiO_2$

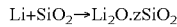

$Li + SiO_2 \rightarrow Li_2O \cdot zSiO_2$

Figure 5:
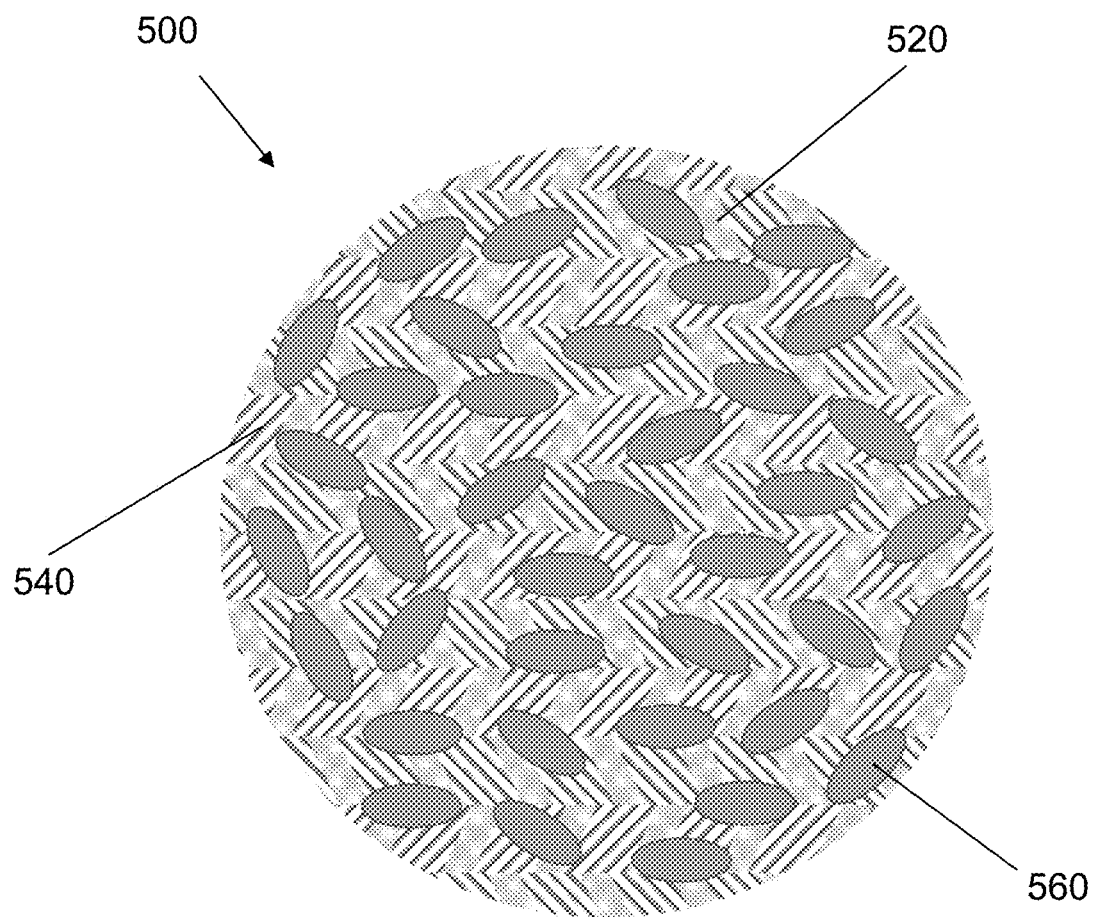
FIG. 5 is a schematic cross-section illustration of a composite silicate-silicide particle, according to an embodiment of the invention.

FIG. 5 is a schematic cross-section illustration of a composite silicate-silicide particle 500, according to an embodiment of the invention. The particle 500 has lithium silicate domains 520, silicon domains 540, and metal silicide domains 560. Although the particle 500 is shown as spherical in FIG. 5, it may have other shapes. Although the particle 500 is shown as having well-defined domains 520, 540, 560 it should be understood that the domains may have any arbitrary shapes. In one embodiment of the invention, the particle 500 is approximately equiaxed with an average diameter that ranges from 0.1 to 500 μm. In one arrangement, the lithium silicate domains 520 make up between 1 wt % and 99 wt % of the particle, and the silicon domains 540 and silicide domains 560 together make up the remaining 99 wt % to 1 wt % of the particle. In one arrangement, the lithium silicate domains 520 range in size from 1 nm to 50 nm. In one arrangement, the silicon domains 540 range in size from 1 nm to 50 nm. In some embodiments, the silicon domains 540 are 15 nm or less. Domain size may be observed through TEM or other imaging techniques. It should be noted that a silicon domain may include multiple silicon grains of smaller size. In one arrangement, the metal silicide domains 560 extend throughout the particle 500. In one arrangement (not shown), the metal silicide domains 560 are primarily near the surface of the particle 500 and form a kind of network that helps to prevent etching of silicon during water processing.

In another embodiment of the invention, composite silicate-silicide particles undergo further processing in order to dope lithium silicate domains, as described above for composite silicate-silicon particles.

In some embodiments, composite silicate-silicide particles include a dopant selected from magnesium, calcium, strontium, barium, boron, aluminum, gallium, indium, thallium, phosphorus, arsenic, antimony, bismuth, titanium, zirconium, hafnium and combinations thereof. In some embodiments, the dopant is one of aluminum, magnesium, and zirconium. The dopant may be in the lithium silicate domains or otherwise in the particle. In some embodiments, the dopant may be primarily near the surface of the particle, or distributed throughout the particle. In some embodiments, the dopant is primarily near the surface of the particle with the metal silicide domains distributed homogenously throughout the particle.

According to various embodiments, the particles may be characterized by one or more of the following attributes. First, as described above, in some embodiments, the particles are characterized by including both a metal silicide ($M_aSi_b$) and a lithium silicate ($Li_2O \cdot xSiO_2$.) In some embodiments, the metal is one or more of copper, manganese, and nickel. In some embodiments, the particles have an oxygen:metal (O:M) molar ratio of 10:1-25:1, e.g., 17:1.

In some embodiments, the particle further includes a dopant selected from magnesium, calcium, strontium, barium, boron, aluminum, gallium, indium, thallium, phosphorus, arsenic, antimony, bismuth, titanium, zirconium, hafnium and combinations thereof. In some embodiments, the dopant is one of aluminum, magnesium, and zirconium. The particle may be characterized by having an M:dopant molar ratio of between about 1:2 to 5:1. In some embodiments, the ratio is about 2:1.

As described above, in some embodiments, silicon-oxide based particles are mixed with a metal salt to form a metal silicide with a dopant optionally included. In some embodiments, the relative amounts of M:dopant:SiO may be characterized as: M (e.g., Cu) is 1-20%; dopant (e.g., Al) is 0-10%; with the balance SiO. In some embodiments, M is 2-10%; dopant is 0-5%; with the balance SiO. In some embodiments, M is about 2% and dopant about 1%.

Battery Cells

Figure 6:
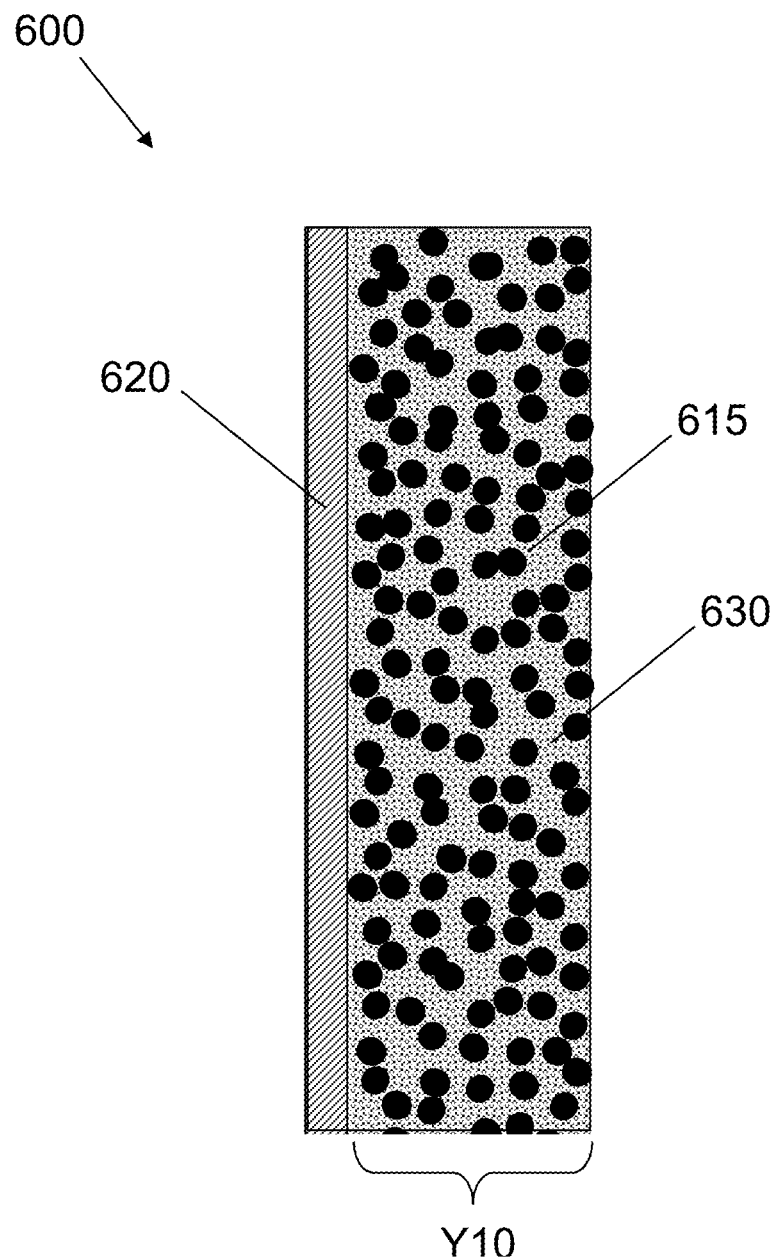
FIG. 6 is a schematic cross-section illustration of a negative electrode, according to an embodiment of the invention.

FIG. 6 is a schematic cross-section drawing that shows a negative electrode assembly 600, according to an embodiment of the invention. The negative electrode assembly 600 has a negative electrode 610 and a current collector 620. The negative electrode 610 includes negative electrode active material particles 615, such as those described with reference to FIGS. 3 and 5 above, mixed together with electrolyte 630. In some arrangements, the electrode 600 also contains small, electronically-conductive agents (as indicated by small grey dots) such as carbon black, carbon nanotubes or conductive graphite. In one arrangement, the negative electrode active material particles 615 are held together by a binder such as styrene-butadiene rubber/carboxymethylcellulose (CMC/SBR), or other advanced binders such as polyacrylic acid or sodium alginate (not shown), and electrolyte fills the spaces between the negative electrode active material particles 615 and the binder. The negative electrode current collector may be a metal film.

Figure 7:
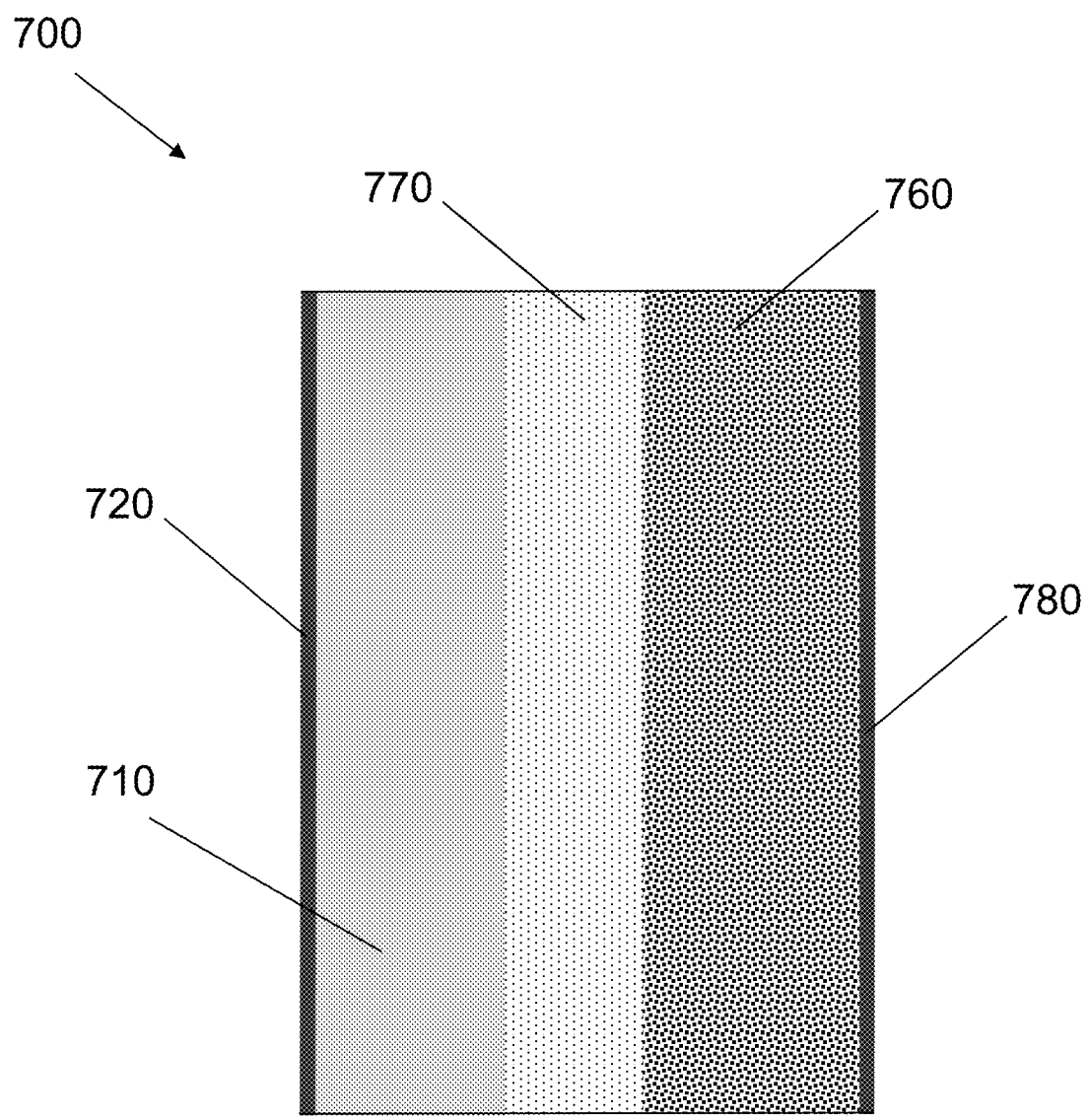
FIG. 7 is a schematic cross-section illustration of battery cell, according to an embodiment of the invention.

FIG. 7 is a schematic cross-section illustration of a battery cell 700 with a novel negative electrode 710, according to an embodiment of the invention. Possible structures and materials for the negative electrode 710 have been described above in FIG. 6. The cell 700 also has a positive electrode 760. There is separator region 770 between the negative electrode 710 and the positive electrode 760. In some arrangements, there is a current collector 780 adjacent to the positive electrode 760 and/or a current collector 720 adjacent to the negative electrode 710.

As is known in the art, a positive electrode 760 generally includes positive electrode active material particles, binder, and electrolyte and may also contain small, electronically-conductive particles such as carbon black. In one arrangement, the positive electrode active material particles are held together by a binder such as PVDF, and the electrolyte fills the spaces between the positive electrode active material particles and the binder. Examples of positive electrode active materials include, but are not limited to, lithium cobalt oxide, nickel cobalt aluminum oxide, nickel cobalt manganese oxide, and others known to a person having ordinary skill in the art.

Any of a number of lithium-containing compounds may be used as positive electrode active material in the embodiments of the invention. In one embodiment, the positive electrode active material may be in the form of $LiMO_2$, where M is a metal e.g., $LiCoO_2$, $LiNiO_2$, and $LiMnO_2$. Lithium cobalt oxide ($LiCoO_2$) is a commonly used material for small cells but it is also one of the most expensive. The cobalt in $LiCoO_2$ may be partially substituted with Sn, Mg, Fe, Ti, Al, Zr, Cr, V, Ga, Zn, or Cu. Lithium nickel oxide ($LiNiO_2$) is less prone to thermal runaway than $LiCoO_2$, but is also expensive. Lithium manganese oxide ($LiMnO_2$) is the cheapest in the group of conventional materials and has relatively high power because its three-dimensional crystalline structure provides more surface area, thereby permitting more ion flux between the electrodes. Lithium iron phosphate ($LiFePO_4$) is also now used commercially as a positive electrode active material.

Other examples of the positive electrode active materials include: Li $(M'_xM''_y)O_2$, where M' and M" are different metals (e.g., $Li(Ni_xMn_y)O_2$, $Li(N_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g. $Li(Co_xNi_{1-x})O_2$ and $Li(Co_xFe_{1-x})O_2$), $Li_{1-W}(Mn_xNi_yCo_z)O_2$, (e.g. $Li(Co_xMn_yNi_{(1-x-y)})O_2$, $Li(Mn_{1/3}Ni_{1/3}Co_{1/3})O_2$, $Li(Mn_{1/3}Ni_{1/3}CO_{1/3}-xMg_x)O_2$, $Li(Mn_{0.4}Ni_{0.4}Co_{0.2})O_2$, $Li(Mn_{0.1}Ni_{0.1}CO_{0.8})O_2$) $Li_{1-W}(Mn_xNi_xCo_{1-2x})O_2$, $Li_{1-W}(Mn_xNi_yCoAl_W)O_2$, $Li_{1-W}(Ni_{x-}Co_yAl_z)O_2$ (e.g., $Li(Ni_{0.8}Co_{0.15}Al_{0.05})O_2$), $Li_{1-W}(Ni_{x-}Co_yM_z)O_2$, where M is a metal, $Li_{1-W}(Ni_xMn_yM_z)O_2$, where M is a metal, $Li(Ni_{x-y}Mn_yCr_{2-x})O_4$, $LiM'M''_2O_4$, where M' and M" are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3$) $Li_xV_yO_z$, e.g. $LiV_3O_8$, $LiV_2O_5$, and $LiV_6O_{13}$. One group of positive electrode active materials may be described as $LiMPO_4$, where M is a metal. Lithium iron phosphate ($LiFePO_4$) is one example in this group. Other examples include $LiM_xM''_{1-x}PO_4$ where M' and M" are different metals, $LiFe_xM_{1-x}PO_4$, where M is a metal (e.g., $LiVOPO_4$ $Li_3V_2(PO_4)_3$), $LiMPO_4$, where M is a metal such as iron or vanadium. Further, a positive electrode may include a secondary active material to improve charge and discharge capacity, such as $V_6O_{13}$, $V_2O_5$, $V_3O_8$, $MoO_3$, $TiS_2$, $WO_2$, $MoO_2$, and $RuO_2$. In some arrangements, the positive electrode active material includes $LiNiVO_2$.

The separator region 770 may contain any electrolyte that provides ionic communication between the positive electrode 760 and the negative electrode 710. In various arrangements, the separator region 770 contains the same electrolyte as in the negative electrode 710 and in the positive electrode 760.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof. In some embodiments, a fluorinated ether solvent having the formula R—O—R' is used, where R and R' are independently $C_xH_{2x+1-y}F_y$, where x and y are integers.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiCl_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3Fl)_3$, $LiPFs(iso-C3Fl)$, lithium salts having cyclic alkyl groups (e.g., (CF2)2(SO2)2xLi and (CF2)3(SO2)2xLi), and combinations thereof. Common combinations include $LiPF_6$ and $LiBF_4$, $LiPF_6$ and $LiN(CF_3SO_2)_2$, $LiBF_4$ and $LiN(CF_3SO_2)_2$.

Examples

The following examples provide details relating to composition, fabrication and performance characteristics of block copolymer electrolytes in accordance with the present invention. It should be understood the following is representative only, and that the invention is not limited by the detail set forth in these examples.

Silicon-oxide-based particles (50 grams) that had a Si:O ratio of 1:1 and an average size of 5 μm were mixed with copper acetate equal to 10% wt of Cu and 5% wt sucrose in 500 mL deionized water. The suspension was dispersed and dried via a spray dryer to form precursors. The product with uniform distribution of Cu and sucrose was collected and annealed in argon for 4 hours to form essential copper silicide grains. Afterward, the materials were dispersed in 300 mL anhydrous tetrahydrofuran. Biphenyl (2 grams) was added into the solution and then 5 grams of polished lithium metal foil was added into the solution. The solution was stirred in a sealed container for 24 hours until all lithium metal was absorbed by the materials. After the solvent was filtered out, the materials were dried and annealed under argon at 600° C. for 2 hours to form composite silicate-silicide particles to be used as active material in a battery cell anode.

The composite silicate-silicide particles were mixed in a water based slurry at a concentration of 9% and used to form an anode. The slurry also contained 1% SBR and 0.8% CMC, as well as 0.1% carbon nanotubes, the rest of which was graphite. After coating the slurry onto a copper foil, the anode was dried and pressed to 1.65 g/cc for battery cell assembly. The battery contained the anode, a polyethylenebased separator and a lithium cobalt (LCO) cathode. An electrolyte containing 1.2M $LiPF_6$ in 3:7 EC:DMC solution added to the battery cell before testing.

For comparison, a second battery cell was prepared using silicon-oxide-based particles that had not been converted to composite silicate-silicide particles as the anode active material. The silicon-oxide-based particles had a Si:O ratio of 1:1 and were used to make a battery cell in the same way as the composite silicate-silicide particles had been, as described above.

Figure 8:
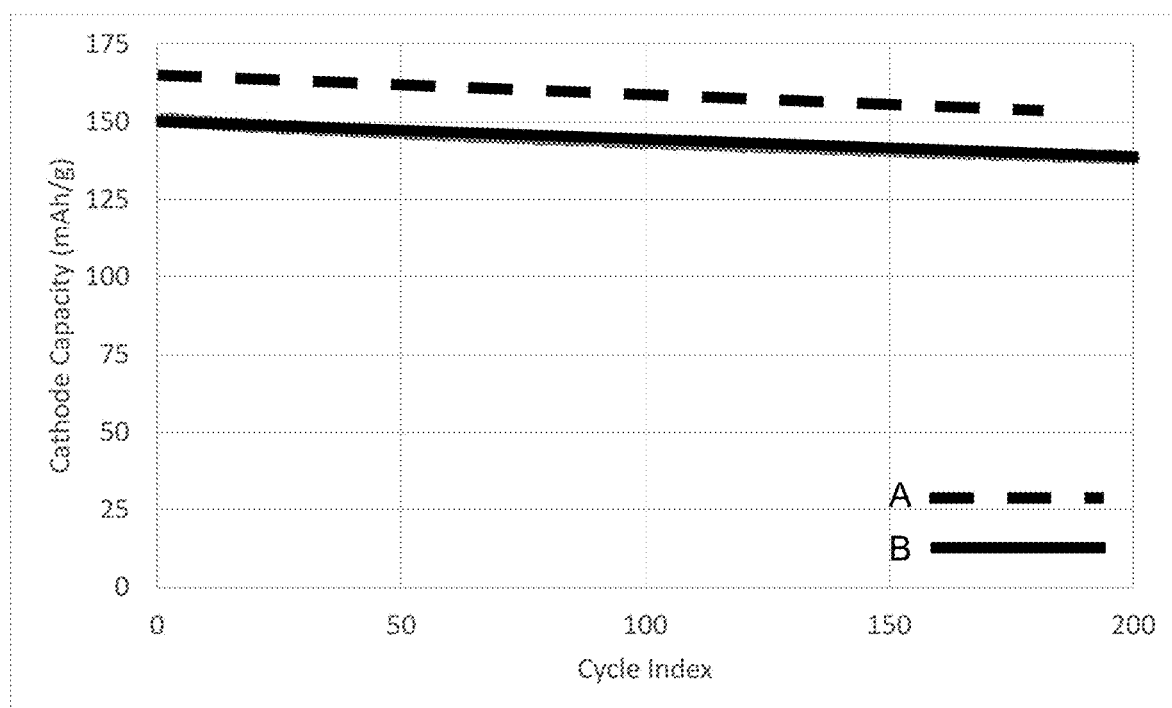
FIG. 8 is a plot that shows battery cell capacity as a function of cycle.

The battery test program included 0.5 C rate charging to 4.4V, constant voltage to 0.05 C and discharge to 3V at 0.5 C rate. The specific capacity delivered per cathode weight (specific capacity) versus cycle index was used as a benchmark for cell performance. FIG. 8 shows the test results for the anode (A) made with composite silicate-silicide particles and for the anode (B) made with silicon-oxide-based particles. Both anodes have similar slopes of decay, but anode A has much higher capacity.

Composite silicate-silicide particles were formed using various concentrations of a metal (Cu) and a dopant (Al) as described above. In particular the following the following concentrations were used to form the particles:
Cu only: 2, 10, 15, 5
Cu/Al: 1/2.5, 10/1, 10, 5, 2/1, 2/2, 2/2.5, 3/1.5, 5/2, 5/2.5

Figure 9:
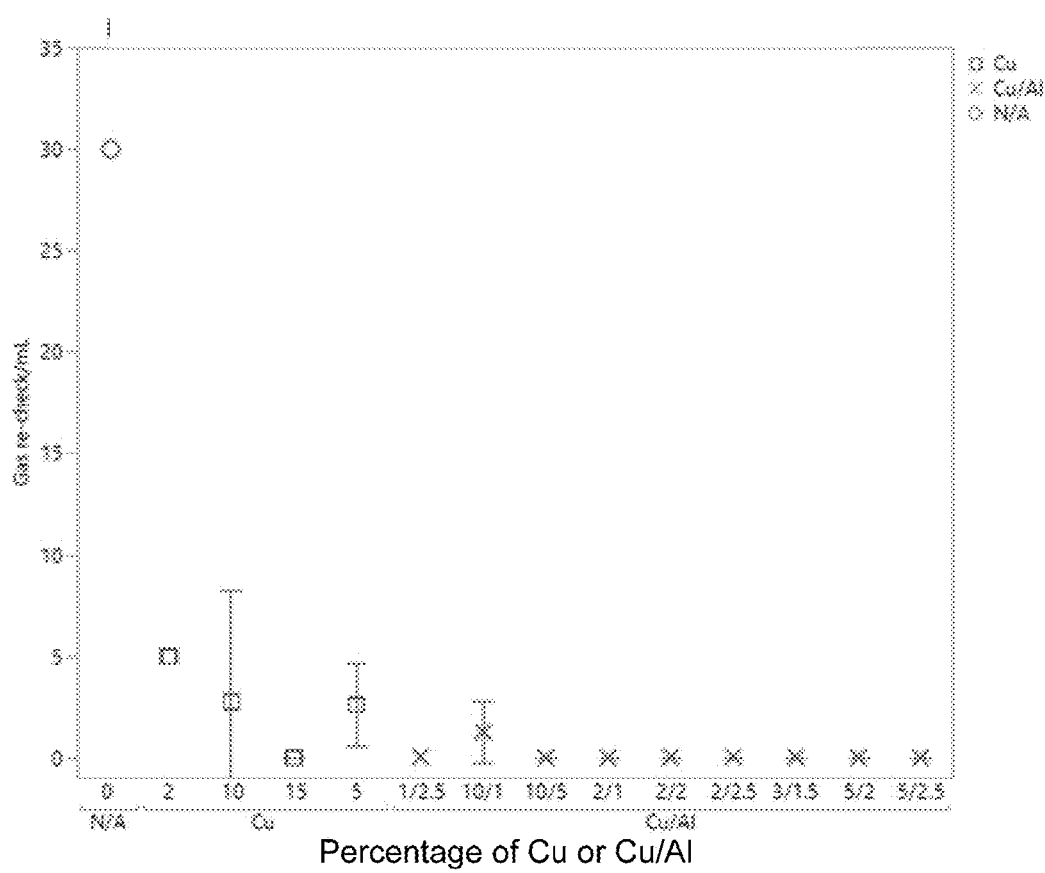
FIG. 9 is a plot showing gas generated as a function of percentage of copper and aluminum in particles.

The concentrations are given in molar percentages with the balance of being SiO in the starting SiO+Cu+Al mixture. 1 g of each powder was soaked in deionized water 60 h. The total volume of gas at 1 atm measured after soaking was measured and plotted in FIG. 9. As can be seen, the presence of Al significantly decreases gas generation. This is significant; if the material generates gas after water exposure, the aqueous slurry for an anode involving this material may contain a lot of bubbles or even become foam. This can prevent uniform coating of active material on the current collector.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An active material for an anode in a lithium ion battery cell, comprising:
   particles comprising:
   domains comprising silicon;
   domains comprising metal silicide; and
   domains comprising lithium silicate;
   wherein each particle has an outer surface and wherein at least some of the lithium silicate domains comprise one or more dopants.

2. The active material of claim 1 wherein metal silicide comprises silicon and a metal selected from the group consisting of chromium, cobalt, copper, iron, nickel, manganese, titanium, vanadium, and combinations thereof.

3. The active material of claim 1 wherein the outer surface comprises at least some lithium silicate domains, and at least some of the lithium silicate domains at the surface have a higher doping concentration than lithium silicate domains that are not at the surface.

4. The active material of claim 1 wherein the dopant is selected from the group consisting of magnesium, calcium, strontium, barium, boron, aluminum, gallium, indium, thallium, phosphorus, arsenic, antimony, bismuth, titanium, zirconium, hafnium and combinations thereof.

5. The active material of claim 1 wherein at least a portion of the outer surface comprises metal silicide domains.

6. The active material of claim 1 wherein the particles comprise one or more metals selected from the group consisting of chromium, cobalt, copper, iron, nickel, manganese, titanium, vanadium, and combinations thereof.

7. The active material of claim 1 wherein the particles are characterized by having a molar ratio of oxygen:metal of 10:1-25:1.

8. A negative electrode film, comprising a mixture of:
   particles of active material according to claim 1;
   graphite particles; and
   a binder.

9. The negative electrode film of claim 8 wherein the negative electrode film further comprises electronically conductive particles.

10. The negative electrode film of claim 8 further comprising a current collector in electronic communication with the negative electrode film.

11. A battery cell, comprising:
    a negative electrode comprising a mixture of particles of active material according to claim 1, graphite particles, a binder, an optional current collector, and an electrolyte;
    a positive electrode comprising positive electrode active material particles, electronically-conductive particles, an optional current collector, and the electrolyte;
    a separator region between the positive electrode and the negative electrode, the separator region comprising the electrolyte.

12. The battery cell of claim 11 wherein the electrolyte is selected from the group consisting of LiPF6, LiBF4, LiAsF6, LiN(CF3SO2)2, LiN(C2F5SO2)2, LiCF3SO3 etc. dissolved in propylene carbonate (PC), ethylene carbonate (EC), diethyl carbonate (DEC), dimethyl carbonate (DMC), ethyl methyl carbonate (EMC), ethyl propionate (EP), propyl propionate (PP), 1,2-dimethoxyethane (DME), 1,4-dioxane (DOL), hydrofluoroether (HFE) and tetrahydrofuran (THF).

13. The battery cell of claim 11 wherein the positive electrode active material particles are selected from the group consisting of lithium cobalt oxide (LCO) lithium nickel oxide (LNO), lithium manganese oxide (LMO), lithium nickel-manganese-cobalt oxide (NMC), lithium nickel-cobalt-aluminum oxide (NCA), lithium iron phosphate (LFP), lithium cobalt phosphate (LCP), and lithium vanadium phosphate (LVP).

14. The active material of claim 1, wherein the particles are characterized by having a molar ratio of metal:dopant of 1:2 to 5:1.

15. An active material for an anode in a lithium ion battery cell, comprising:
    particles comprising:
    domains comprising silicon;
    domains comprising metal silicide; and
    domains comprising lithium silicate;
    wherein each particle has an outer surface; and
    wherein the particles are characterized by having a molar ratio of oxygen:metal of 10:1-25:1.

16. The active material of claim 15 wherein metal silicide comprises silicon and a metal selected from the group consisting of chromium, cobalt, copper, iron, nickel, manganese, titanium, vanadium, and combinations thereof.

17. The active material of claim 15 wherein at least a portion of the outer surface comprises metal silicide domains.

18. The active material of claim 15 wherein the particles comprise one or more dopants selected from the group consisting of chromium, cobalt, copper, iron, nickel, manganese, titanium, vanadium, and combinations thereof.

19. A negative electrode film, comprising a mixture of:
particles of active material according to claim 15;
graphite particles; and
a binder.

20. A battery cell, comprising:
a negative electrode comprising a mixture of particles of active material according to claim 15, graphite particles, a binder, an optional current collector, and an electrolyte;
a positive electrode comprising positive electrode active material particles, electronically-conductive particles, an optional current collector, and the electrolyte;
a separator region between the positive electrode and the negative electrode, the separator region comprising the electrolyte.

\* \* \* \* \*